United States Patent
Maegawa

(10) Patent No.: US 6,488,225 B2
(45) Date of Patent: Dec. 3, 2002

(54) TEMPORARY ROTATION CLAMPING MECHANISM FOR A CABLE REEL

(75) Inventor: Akihito Maegawa, Yokkaichi (JP)

(73) Assignee: Sumitomo Wiring Systems, Ltd., Yokkaichi (JP)

(*) Notice: Subject to any disclaimer, the term of this patent is extended or adjusted under 35 U.S.C. 154(b) by 0 days.

(21) Appl. No.: 09/893,672

(22) Filed: Jun. 29, 2001

(65) Prior Publication Data

US 2002/0005450 A1 Jan. 17, 2002

(30) Foreign Application Priority Data

Jul. 13, 2000 (JP) ........................................ 2000-213082

(51) Int. Cl.[7] ............................. B65H 75/38; H01R 3/00
(52) U.S. Cl. ................. 242/388.5; 242/388; 242/385.4; 439/164
(58) Field of Search ............................. 242/385, 385.4, 242/388, 398, 402, 388.5; 439/15, 164

(56) References Cited

U.S. PATENT DOCUMENTS

| | | | | |
|---|---|---|---|---|
| 5,257,943 A | * | 11/1993 | Ueno et al. | 439/164 |
| 5,593,310 A | * | 1/1997 | Kawamoto et al. | 439/164 |
| 5,674,081 A | * | 10/1997 | Hoffmann et al. | 439/164 |
| 5,683,260 A | * | 11/1997 | Kato et al. | 439/164 |
| 5,741,145 A | * | 4/1998 | Kikkawa et al. | 439/164 |
| 5,800,191 A | * | 9/1998 | Honda et al. | 439/164 |
| 5,871,366 A | * | 2/1999 | Nishikigi et al. | 439/164 |
| 6,059,590 A | * | 5/2000 | Bolen et al. | 439/164 |
| 6,309,233 B1 | * | 10/2001 | Nakade et al. | 439/164 |
| 6,368,127 B1 | * | 4/2002 | Araki et al. | 439/164 |

FOREIGN PATENT DOCUMENTS

| | | |
|---|---|---|
| JP | 8-37072 | 2/1996 |
| JP | 2000-48925 | 2/2000 |
| JP | 2000-48926 | 2/2000 |

OTHER PUBLICATIONS

English Language Abstract of JP 8–37072.
English Language Abstract of JP 2000–48925.
English Language Abstract of JP 2000–48926.

* cited by examiner

*Primary Examiner*—Kathy Matecki
*Assistant Examiner*—Minh-Chau Pham
(74) *Attorney, Agent, or Firm*—Greenblum & Bernstein, P.L.C.

(57) ABSTRACT

A mechanism is provided for removing rotation clamping members in which a rotor of a cable reel is temporarily clamped to a stator. Rotation clamping members which are temporarily positioned over the stator and the rotor of the cable reel are connected with a vertical piece through a hinge that allows a lateral piece to pivot downwardly easily from a root. When removing the rotation clamping member for permitting rotation of the rotor, the lateral piece of the rotation clamping members which is lifted up engages against the periphery of the wheel hub followed by downward pivoting from the root, so that the clamping members are removed smoothly through the side of the wheel boss.

10 Claims, 7 Drawing Sheets

TEMPORARY ROTATION CLAMPING MECHANISM FOR A CABLE REEL

BACKGROUND OF THE INVENTION

1. Field of the Invention

The present invention relates to a temporary clamp mechanism in a cable reel mounted on a steering apparatus of vehicles. The present invention also relates to a temporary clamp mechanism that eliminates the need to provide a steering wheel with a pullout clamp hole under the condition where a rotor of a cable reel is fastened to a steering column with the cable reel temporarily clamped to a stator through a rotation clamping member and the rotation clamping member, which has temporarily stopped the rotation of a rotor, are pulled out after assembling a steering wheel over the stator and rotor.

2. Description of Background Information

A known temporary rotation clamping mechanism for a cable reel is shown in FIG. 6 from, for example, Japanese Unexamined Patent Publication No.2000-48925. The cable reel 51 is mounted on a steering apparatus of a vehicle for electrically connecting circuits of a vehicle body with electrical devices (a horn switch, an air bag, etc.) A stator 52 fastened to a steering column and a rotor 53 fastened to a steering wheel (hereafter abbreviated as a wheel) side are constructed so that they relatively rotate. In the annular hollow space 54 formed by the stator 52 and the rotor 53, a flat cable 55 is housed in a wound condition and the flat cable 55 is wound up of wound out in accordance with the direction of rotation of the rotor 53 which follows the wheel rotation.

In mounting the aforementioned cable reel 51 on the steering apparatus, the stator 52 and the rotor 53 are positioned in a predetermined rotation phase, and side, generally T-shaped, rotation clamping members 56 are temporarily placed over the stator 52 and the rotor 53 from an upper position so that the stator 52 and the rotor 53 cannot rotate in order to maintain the predetermined rotation phase. That is, a lateral piece 57 of the rotation clamping member 56 is fixed to an upper surface 53a of the rotor 53 through a clamp hole 57a, and a bottom portion 58a of a vertical piece 58 is fixed in the recess 59a of a stop 59 on the peripheral surface of the stator, preventing rotation of the stator and the rotor.

The aforementioned cable reel 51 is fastened to a steering column under the condition of the rotor 53 connected with the stator by the rotation clamping member 56, and subsequently, the steering wheel 60 is assembled on top. After mounting the steering wheel 60 (note FIG. 7), the rotation clamping member 56 is removed to enable the rotor 53 to rotate. That is, as shown in FIG. 7, the wheel hub 61 of the steering wheel 60 is provided with a clamp hole 61a for removing the rotation clamping member 56. In order to effect removal of the rotation clamping member, an operator holds and pulls up the top portion 58b of the vertical piece 58 of the rotation clamping member 56 through the clamp hole 61a.

However, with the temporary rotation clamping construction in the cable reel 51, the clamp hole 61a cannot be machined through the wheel hub of the steering wheel 60, the rotation clamping member 56 must be extracted laterally, and it is difficult to laterally remove the rotation clamping member because of a narrow working space. In addition, when the clamp hole 61a is provided through the wheel hub of the wheel 60, there are problems such as decrease in strength of the wheel 60, and the like.

The present invention has been made considering the aforementioned problems, and makes it possible to remove the rotation clamping member, not by removing it laterally, but by pulling it upwardly without providing the wheel hub of the steering wheel with a clamp hole.

SUMMARY OF THE INVENTION

In order to solve the aforementioned problems, the present invention offers a temporary rotation clamping mechanism for a cable reel, the cable reel being mountable on a steering apparatus and includes a rotor and stator. The rotor is temporarily clamped to the stator through rotation clamping members. The rotation clamping members include a vertical piece positionable in an axial direction of the cable reel and a lateral piece horizontally projecting toward the center of the cable reel from a middle position of the vertical piece, and a lateral piece is connected with the vertical piece through a hinge which is pivotable downwardly. A bottom portion of the vertical piece is inserted into an engaging area provided on an outer peripheral surface of the stator and the lateral piece projects over an upper surface of the rotor. A projection on the upper surface of the rotor is inserted into an engaging clamp hole provided in the lateral piece to temporarily stop rotation of the rotor.

When releasing the rotation clamping, the lateral piece and the rotor are disengaged by holding and pulling up an upper portion of the vertical piece to allow the lateral piece to be lifted up through the outside of the wheel boss by engagement against a periphery of a wheel hub followed by downward pivoting of the hinge, so that the rotation clamping members may be removed.

In another aspect of the temporary rotation clamping mechanism in a cable reel of the present invention, the rotation clamping members temporarily placed over the stator and the rotor have a construction where the lateral piece is connected through the hinge which permits the lateral piece to pivot downwardly from the level of the root. Therefore, the lateral piece of the rotation clamping members may be lifted up to release the clamped rotation of the rotor and the stator which engages the periphery of the wheel hub to pivot downwardly from the level of the root and passes through the outer surface of the wheel hub to be removed smoothly upwardly. As a result, even if a removal clamp hole is not provided through the wheel hub, the rotation clamping members can be quickly removed by turning aside the wheel hub smartly.

In a further aspect of the present invention, the hinge is formed unitarily and in one piece to include a lateral piece with a thin neck portion, and the lateral piece and the vertical piece are formed unitarily and in one piece through the hinge. The rotation clamping members may be formed of any suitable resin, and the vertical piece and the lateral piece are connected through the hinge. It is also possible that the vertical piece and the lateral piece are formed separately and integrated into a unit by engagement.

DESCRIPTION OF THE PREFERRED EMBODIMENTS

In the following description, the present invention is explained more in detail with reference to the attached drawings.

Figure 1:
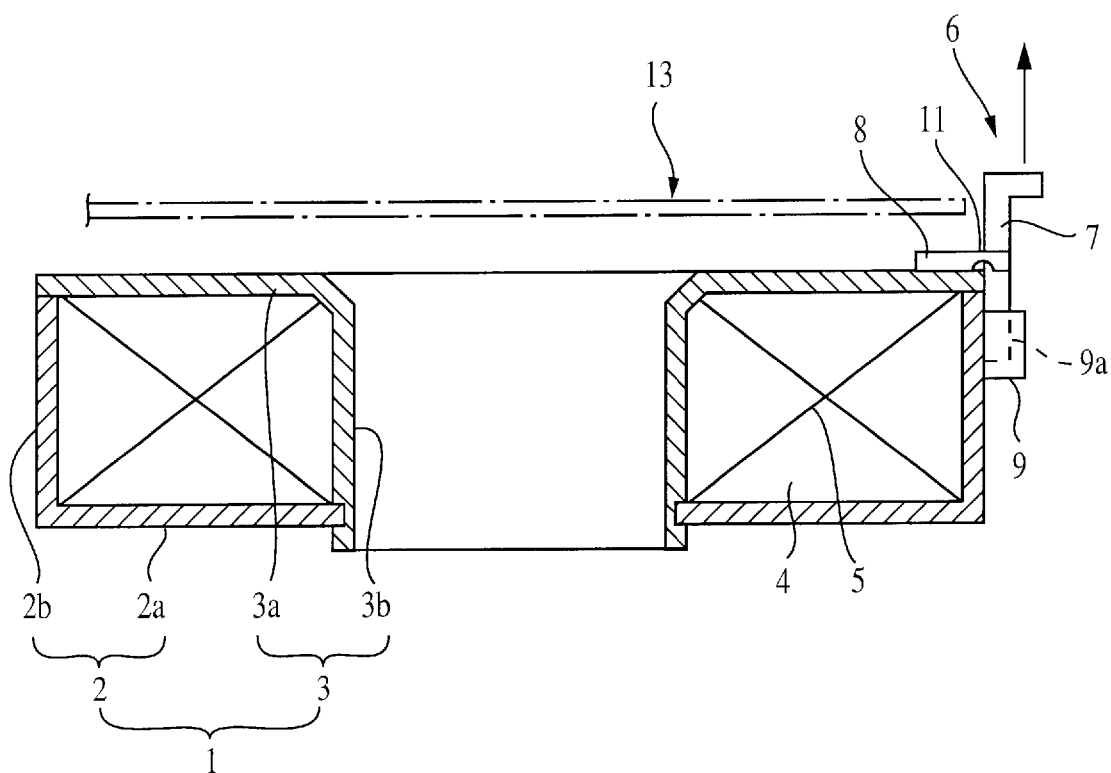
FIG. 1 is a lateral cross-section showing the rotation clamping mechanism according to an embodiment of the present invention.

As shown in FIG. 1, the cable reel 1 includes a stator 2, which is formed with an annular bottom wall 2a and an annular outer peripheral wall 2b, and a rotor 3 which is formed with the annular upper wall 3a and an annular inner peripheral wall or center axis portion 3b, resulting in the ability to rotate coaxially and relatively. A flat cable 5 is housed in a wound condition in an annular hollow space 4 formed by the stator 2 and rotor 3. Opposite ends of the flat cable 5 are fastened to the stator 2 and the rotor 3, respectively, so that the flat cable 5 is wound in or wound out of the hollow space 4 in accordance with the reciprocal rotation of the rotor 3 corresponding to rotation of the steering wheel. This construction is the same as the known construction.

In the cable reel according to the present invention, the predetermined rotation phase is maintained upon mounting to the steering wheel by temporarily placing a lateral, generally T-shaped rotation clamping member 6 from an upper position over the stator 2 and the rotor 3 to make it impossible to rotate the rotor 3 relative to the stator 2.

Figure 2:
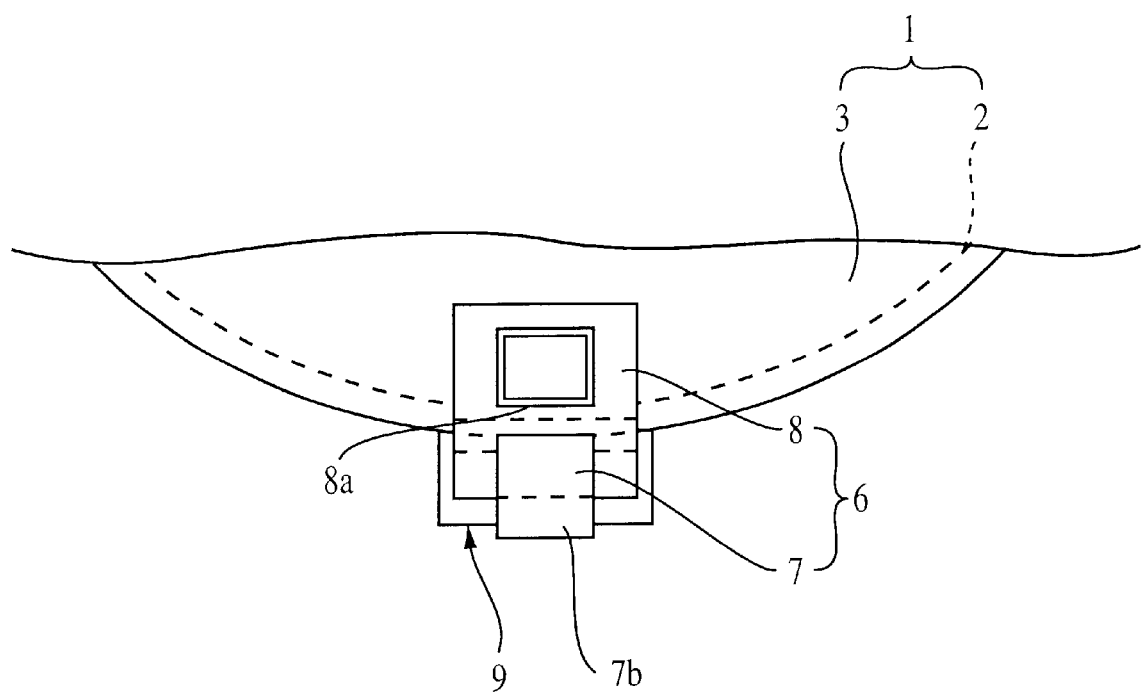
FIG. 2 is a partial plan view showing a portion of the cable reel of FIG. 1.
Figure 3A:
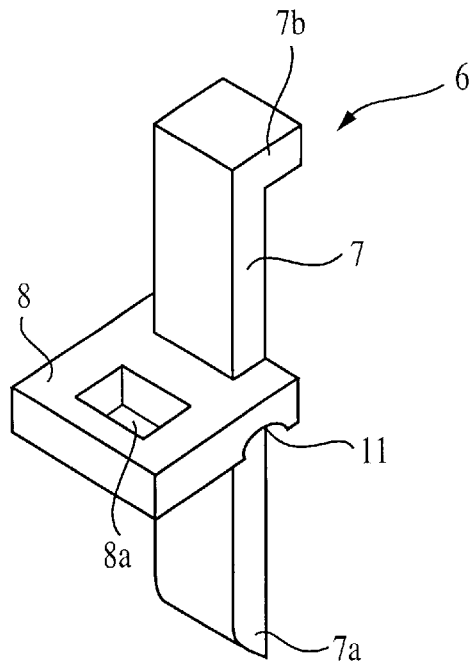
FIG. 3(A) is a perspective view of the rotation clamping members of FIG. 1.
Figure 3B:
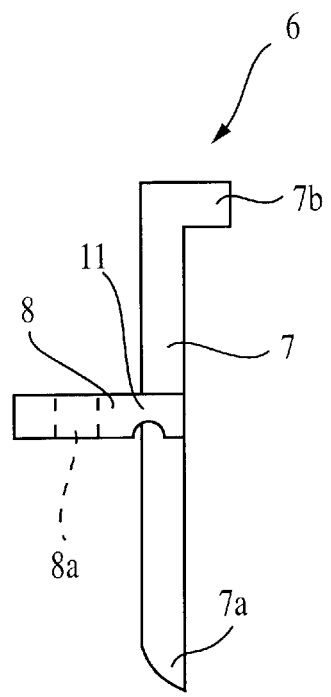
FIG. 3(B) is a front elevation showing the rotation clamping members.

The rotation clamping members 6 are, as shown in FIGS. 3 (A) and (B), generally T-shaped components formed from a suitable material, such as a synthetic resin, assembled from two parts with a vertical piece 7 extending vertically along the side of the cable reel, and a lateral piece 8 horizontally projecting from about the middle of the vertical piece toward the center of the cable reel. With respect to the vertical piece 7 of the rotation clamping members, the bottom portion 7a is straight to the very end, but the end of the top portion 7b is bent approximately 90° outward to facilitate holding thereof. The lateral piece 8 is provided with an engaging clamp hole 8a which extends generally vertically therethrough (in the thickness direction). On the other hand, with respect to the cable reel 1, the stator 2 is provided on the outer surface thereof with an engaging area 9 (notes FIGS. 1 and 2) including a clamp recess 9a, and the rotor 3 is provided on the upper surface with the projection 10.

The rotation clamping members 6 are clamped on the peripheral surface of the stator 2 with the bottom portion 7a of the vertical piece 7 inserted into the clamp recess 9a, and are also clamped on the upper surface of the rotor 3 with the projection 10 engaged within the clamp hole 8a of the lateral piece 8, so that the stator 2 and the rotor 3 cannot rotate. That is, the stator 2 and the rotor 3 are made non-rotatable by operations such that the stator 2 and the rotor 3 are first positioned in the predetermined rotation phase and then, while the end of the bottom portion 7a of the vertical piece 7 of the rotation clamping members 6 enters the clamp recess 9a from above the stator 2 and the rotor 3, the clamp hole 8a of the lateral piece 8 engages with the projection 10 so that the rotation clamping members 6 are positioned on a shoulder of the cable reel 1.

Further to the above disclosed constructions, variations are possible, such as where the bottom portion 7a may be formed larger than the clamp recess 9a and is pressed into the clamp recess 9a, or a projection is provided at the end of the bottom portion 7a to engage with a hook provided inside the clamp recess 9a.

The above-described rotation clamping members 6 are, as shown in FIG. 3, connected with the vertical piece 7 through a hinge 11 which is provided for the lateral piece to pivot downwardly easily from the level of the root. That is, a recessed portion is formed along a width direction adjacent the end of the lateral piece 8 connected to the vertical piece 7 to form a thin root. The hinge and the lateral piece are formed unitarily and in one piece, and the lateral piece 8 can easily pivot downwardly about the root at the hinge. Alternatively, instead of providing the aforementioned thin portion, it is possible to form the hinge by cutting the edges of both sides of the lateral piece 8 to form the root as a slender neck.

In addition, it is possible that the lateral piece and the vertical piece are formed separately and integrated, and upon the integration, the hinge formed by the aforementioned thin portion or the slender neck is provided.

The cable reel 1 is mounted on the steering apparatus in a temporary rotation clamping condition produced between the rotor 3 and the stator 2 by the aforementioned rotation clamping members 6, and the steering wheel 12 is then mounted over the cable reel 1. After assembling the steering wheel 12, the rotation clamping members, which make impossible for the stator and the rotor to rotate, are removed to release the temporary rotation clamp.

Figure 4:
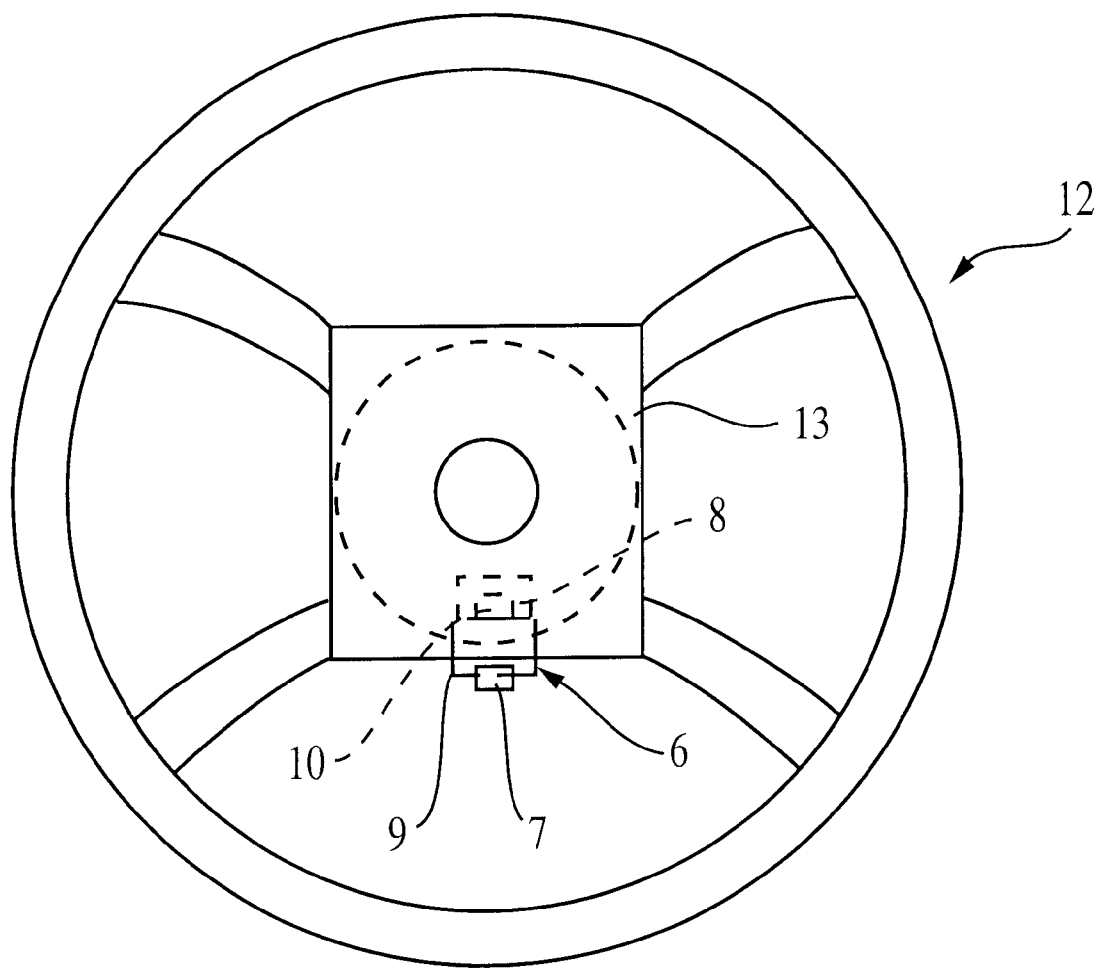
FIG. 4 is a plan showing the assembled condition of the cable reel and steering wheel in accordance with the present invention.
Figure 5A:
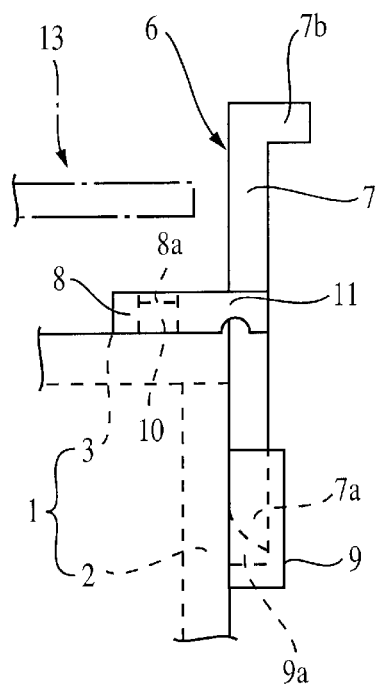
FIG. 5(A) is a front elevation view of the retention clamping member showing a temporary clamped condition.

As shown in FIG. 4, a hole formerly provided for withdrawing the clamp members is not provided in the wheel hub 13 at the center of the steering wheel 12. As shown in FIG. 5(a), the top portion 7b of the rotation clamping members 6 is positioned a little higher than the wheel boss 13 near the periphery of the wheel hub 13.

Figure 5B:
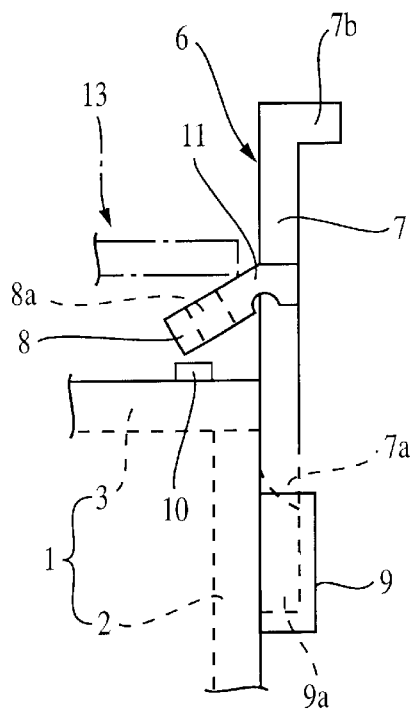
FIG. 5(B) is a front elevation view showing conditions of connecting the rotation clamping members.
Figure 6:
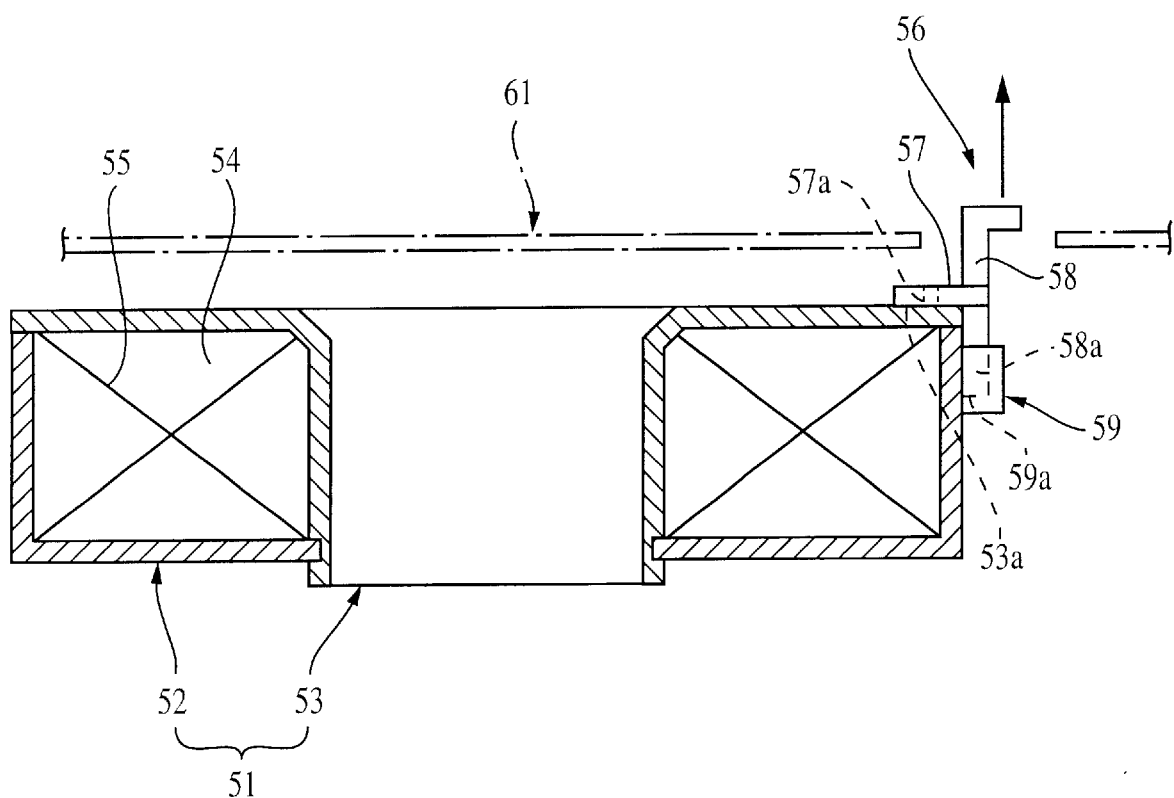
FIG. 6 is a lateral cross-section showing a known rotation clamping mechanism.
Figure 7:
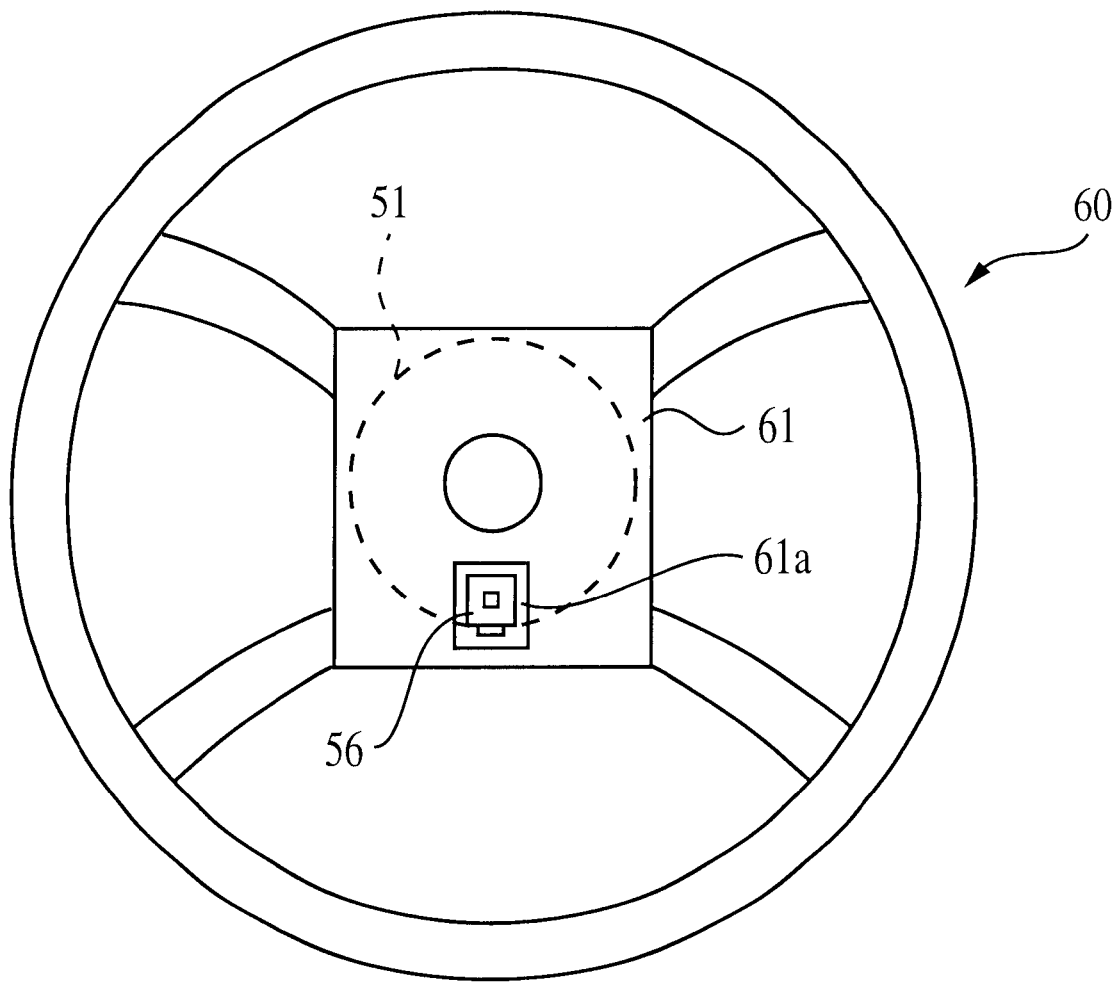
FIG. 7 is a plan view showing the assembled condition of the known cable reel and steering wheel of FIG. 6.

In order to remove the rotation clamping members 6, it is sufficient for the operator to hold and lift up the top portion 7b of the rotation clamping members 6. As shown in FIG. 5(b), the lateral piece 8 of the rotation clamping members 6, which are lifted up, engages the periphery of the wheel hub 13, and pivots downwardly about the root of the hinge, and can be smoothly withdrawn through the outer surface of the wheel hub 13, so that the rotation clamping members are quickly removed.

As is clear from the aforementioned explanation, according to the present invention of the rotation clamping mechanism in a cable reel, the rotation clamping members are temporarily placed over the stator and the rotor. Since the lateral piece is connected with the vertical piece through a hinge which allows the lateral piece to pivot downwardly from the root of the hinge, when the parts are lifted up to release the rotation clamp of the rotor, the lateral piece engages against the periphery of the wheel hub, pivots downwardly from the level of the root, and is withdrawn smoothly through the outer surface of the wheel hub. Therefore, the rotation clamping members are quickly removed and smartly evade the wheel hub even if a removal hole is not provided. Additionally, since it is not necessary to provide for the wheel hub with a hole, there is no concern regarding a reduction in strength of the wheel by provision of the hole for removal of the clamping members.

In addition, if a structure is made so that the hinge which permits the lateral piece of the rotation clamping members lower is formed unitarily and in one piece with the lateral piece with the root of the lateral piece formed to have a thin or slender neck portion, the hinge is able to be simultaneously formed upon forming the rotation clamping members.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The present application claims priority under 35 U.S.C. §119 of Japanese Patent Application No. JP 2000-213082, filed on Jul. 13, 2000, the disclosure of which is expressly incorporated herein by its entirety.

What is claimed is:

1. A temporary rotation clamping mechanism for a cable reel, the cable reel being mountable on a steering apparatus and including a rotor and a stator, and wherein the rotor is temporarily clamped to the stator through rotation clamping members, said rotation clamping members comprising:

a vertical piece positionable in an axial direction of the cable reel and a lateral piece horizontally projecting toward the center of the cable reel from a middle position of said vertical piece, and said lateral piece being connected with said vertical piece through a hinge which is pivotable downwardly;

a bottom portion of said vertical piece is insertable into an engaging area provided on an outer peripheral surface of the stator so that said lateral piece projects over an upper surface of the rotor, and a projection on the upper surface of the rotor is insertable into an engaging clamp hole provided in said lateral piece to temporarily stop rotation of the rotor; and when releasing the rotation clamping, said lateral piece and the rotor are disengaged by holding and pulling up an upper portion of said vertical piece to allow said lateral piece to be lifted up through the outside of a wheel hub by engagement of said lateral piece against a periphery of the wheel hub followed by downward bending of said hinge, so that the rotation clamping members may be removed.

2. The temporary rotation clamping mechanism in a cable reel as claimed in claim 1, in which said hinge is formed unitarily and in one piece with said lateral piece to include a thin neck portion provided at the root of said lateral piece, and said vertical piece is formed unitarily and in one piece with said hinge.

3. The temporary rotation clamping mechanism in a cable reel as claimed in claim 1, wherein said hinge is formed unitarily and in one piece with said lateral piece, and said lateral piece is separately formed and fixedly attached to said vertical piece.

4. A temporary rotation clamping mechanism for a cable reel, the cable reel being mountable on a steering apparatus and including a rotor and a stator, said rotation clamping mechanism comprising:

a vertical piece positionable in an axial direction of the cable reel;

a lateral piece projecting toward the center of the cable reel, said lateral piece hingedly connected to said vertical piece and including an engaging clamp hole;

an engaging area provided on an outer peripheral surface of the stator to receive a lower portion of said vertical piece which is insertable therein; and a projection on the upper surface of the rotor being insertable into said engaging clamp hole provided in said lateral piece to temporarily stop rotation of the rotor;

wherein said lateral piece is configured to project over an upper surface of the rotor during clamping with said projection received in said engaging clamp hole to provide rotation clamping, whereby in order to release the rotation clamping, said lateral piece and the rotor are disengageable by pulling a portion of said vertical piece to allow said lateral piece to be lifted up through the outside of a wheel hub by engagement of said lateral piece against a periphery of the wheel hub followed by pivoting of said hinge, so that said rotation clamping members may be removed.

5. The temporary rotation clamping mechanism as recited in claim 1, wherein said lateral piece is positioned at a central position of said vertical piece.

6. The temporary rotation clamping mechanism as recited in claim 5, wherein said lateral piece is hingedly connected with said vertical piece through a hinge which is pivotable downwardly.

7. The temporary rotation clamping mechanism as recited in claim 6, wherein said hinge is formed unitarily and in one piece with said lateral piece.

8. The temporary rotation clamping mechanism as recited in claim 7, wherein said hinge includes a thin neck portion provided at the root of said lateral piece.

9. The temporary rotation clamping mechanism as recited in claim 8, wherein said vertical piece is formed unitarily and in one piece with said hinge.

10. The temporary rotation clamping mechanism as recited in claim 6, wherein said hinge is formed unitarily and in one piece with said lateral piece, and said lateral piece is separately formed and fixedly attached to said vertical piece.

* * * * *